United States Patent [19]

Takeuchi et al.

[11] Patent Number: 5,654,834
[45] Date of Patent: Aug. 5, 1997

[54] LENS BARREL HAVING AT LEAST TWO CYLINDERS WHICH JOIN TO BLOCK OUT LEAKAGE LIGHT

[75] Inventors: Yoshihiro Takeuchi, Tokyo; Hiroshi Terunuma, Ichikawa, both of Japan

[73] Assignee: Nikon Corporation, Tokyo, Japan

[21] Appl. No.: 433,721

[22] Filed: May 3, 1995

Related U.S. Application Data

[63] Continuation of Ser. No. 151,026, Nov. 12, 1993, abandoned.

[30] Foreign Application Priority Data

Dec. 8, 1992 [JP] Japan .................. 4-084418 U

[51] Int. Cl.$^6$ .................. G02B 7/02; G02B 15/14
[52] U.S. Cl. .................. 359/826; 359/704
[58] Field of Search .................. 359/826, 611, 359/704, 827, 830

[56] References Cited

U.S. PATENT DOCUMENTS

| | | | |
|---|---|---|---|
| 1,688,370 | 10/1928 | Wittel | 359/611 |
| 2,087,020 | 7/1937 | Colaiale | 359/611 |
| 2,401,367 | 6/1946 | Nagel | 359/611 |
| 2,851,924 | 9/1958 | Beusker | 359/826 |
| 2,898,832 | 8/1959 | Schmuck | 359/826 |
| 4,326,789 | 4/1982 | Aoyagi | 354/286 |

FOREIGN PATENT DOCUMENTS 4-295811  10/1992  Japan .

*Primary Examiner*—Georgia Y. Epps
*Assistant Examiner*—Ricky Mack

[57] ABSTRACT

In a lens barrel having at least two joinable cylinders made of plastic, a sink mark is hard to be formed in the two cylinders and the compactness of the lens barrel and low cost are maintained while the construction is not complex and the number of parts is not increased. The leakage of light is prevented even when a joint is shallow.

3 Claims, 5 Drawing Sheets

LENS BARREL HAVING AT LEAST TWO CYLINDERS WHICH JOIN TO BLOCK OUT LEAKAGE LIGHT

This application is a continuation of application Ser. No. 08/151,026, filed Nov. 12, 1993, now abandoned.

BACKGROUND OF THE INVENTION

1. Field of the Invention

The present invention relates to a lens barrel having at least two joinable cylinders.

2. Related Background Art

A prior art lens barrel of this type is explained below.

FIG. 1 shows a sectional view of a compact camera, in which a male helicoid 3 meshes with an inside of a female helicoid 1 which is rotated around a center of an optical axis by a motor, not shown and a gear train, not shown. The male helicoid 3 is made of plastic and driven along the optical axis by a straight key 2. A cylinder 4 having a lens barrier, not shown is joined as shown by 5 in FIG. 1. The cylinder 4 is also made of plastic, and the lens barrel is formed by joining the male helicoid 3 and the cylinder 4 together.

The lens barrel should be joint free and integral, but in order to allow mounting of the lens barrier and a lens shutter in the lens barrel because of the internal structure of the lens barrel, one portion (the cylinder 4) and another portion (the male helicoid 3) are provided, and the lens barrier is arranged in the one portion while the lens shutter is arranged in the other portion, and they are joined to form the lens barrel.

An enlarged view of the joint 5 of the male helicoid 3 and the cylinder 4 is shown in FIG. 2. In the joint, a periphery 4a is formed on an inner periphery of the cylinder 4 and a periphery 3a is formed on an outer periphery of the male helicoid 3, and the periphery 3a is fitted to the periphery 4a of the cylinder 4 so that the male helicoid 3 and the cylinder 4 are joined as shown by the joint 5 of FIG. 1.

FIG. 3 shows an enlarged view of another prior art joint. Tapers 6a and 7a are formed in a male helicoid 6 and a cylinder 7, and the male helicoid 6 is joined to the cylinder 7 while the tapers 6a and 7a face to each other to form a lens barrel.

The tapers 6a and 7a are provided to prevent the occurrence of a "sink mark" which is a disadvantage in the plastic and defined as follows. When a molding material in a mold is cooled to solidify, a thinner portion of the molded article is solidified first. As a result, plastic in a thicker area is pulled by the thinner portion so that a recess is formed in the thicker area. The recess created on the surface of the molded article is called sink mark.

In FIG. 2, since abutments 3a and 4a of the male helicoid 3 and the cylinder 4 are planar as shown, a leakage of light into the lens barrel does not occur even if the joint is loose and a gap a is created as shown, but the following problem arises because the portion 4c which includes the abutment 4a is thin and a portion 4e on the left of a root 4d of the portion 4c is thick.

The right hand thin portion 4c is solidified first and a sink mark is created in the left hand thick portion 4e by the portion 4c so that the portion 4e is deformed and the root 4d of the thin portion 4c is also deformed. By this deformation, the right hand thin portion 4c is deformed such that it is torn off the abutment 3a of the male helicoid 3 to create a gap between it and the abutment 3a of the male helicoid 3, and the leakage of light occurs from the exterior of the lens barrel to the interior through the gap.

As the thin portion 4c of the cylinder 4 is formed to be torn off the abutment 3a of the male helicoid 3, the external appearance of the lens barrel is spoiled. Further, the right hand thin portion 4c may be bent toward the inner hollow area of the cylinder 4 by the sink mark of the thick portion 4e before the cylinder 4 is joined to the male helicoid 3. As a result, the cylinder 4 is hard to be joined to the male helicoid 3.

A sink mark is also produced in the thick portion 3e of the male helicoid 3 by the solidification of the thin portion 3c including the abutment 3a through the root 3d, and the thin portion 3c is deformed to be bent by the sink mark. As a result, a gap is created, which causes the leakage of light and deteriorates the joint to the cylinder 4.

In order to solve the problem of the sink mark, the material may be changed from plastic to metal but it raises a problem of increased cost.

In FIG. 3, in order to prevent the sink mark, tapers 6a and 7a are formed. Specifically, the thickness of a portion 7c on the right of a root of a joint 7b of the cylinder is not much thinner than a thick portion 7e on the left as it is at an end portion 7d but it is slightly thinner than the thick portion 7e. As a result, the sink mark is hard to form in the thick portion 7e. Further, by the formation of the taper 7a, the thickness of the joint 7b is gradually thinner as it goes from the left to the right so that the sink mark is hard to form in the joint 7b. As a result, the joint is not deformed and the problem discussed above in connection with FIG. 2 may be solved. Since the taper 6a is formed in the male helicoid as well, the above problem may be solved.

However, because of the tapers 6a and 7a, the left cylinder 7 is retracted from the male helicoid 6 so that a gap a shown in FIG. 3 and a gap between the tapers 6a and 7a are created and the leakage of light takes place as described above. In order to prevent the leakage of light, the joint should be made with care but it impedes the assembling work and leads to increased cost.

When an attempt is made to provide a light shielding member in the lens barrel in order to prevent the leakage of light, the construction is complex, the number of parts increases, and the cost rises. Since the inner diameter of the lens barrel is determined by the internal members such as a shutter, the size of the lens barrel increases when the light shielding member is provided. This is the opposite of the intended goal of compactness of the lens barrel.

SUMMARY OF THE INVENTION

It is an object of the present invention to prevent the occurrence of the sink mark when a plastic material is used, without making the construction complex and increasing the number of parts while keeping the compactness of the lens barrel keeping the cost low, and preventing the leakage of light even when the joint is shallow.

In order to achieve the above object, in accordance with the present invention, there is provided a lens barrel having at least two joinable cylinders made of plastic, in which an outer periphery of one of said two cylinders has a first periphery and a second periphery formed thereon circumferentially of said one cylinder sequentially from one end to the other end of said one cylinder, said second periphery having a smaller outer diameter than that of the outer periphery of said one cylinder and said first periphery being tapered such that an outer diameter thereof increases as it goes from said one end of said one cylinder to said second periphery; and an inner periphery of the other cylinder has a third periphery and a fourth periphery formed thereon circumferentially of said other cylinder sequentially from one end of said other cylinder to the other end, said third periphery having a larger inner diameter than that of said other cylinder and said fourth periphery being tapered such that an inner diameter thereof decreases as it goes from said third periphery to the inner periphery of said other cylinder; whereby said one cylinder and said other cylinder are joined such that said second periphery is fitted to said third periphery and said first periphery faces to said fourth periphery.

DETAILED DESCRIPTION OF THE PREFERRED EMBODIMENTS

Figure 1:
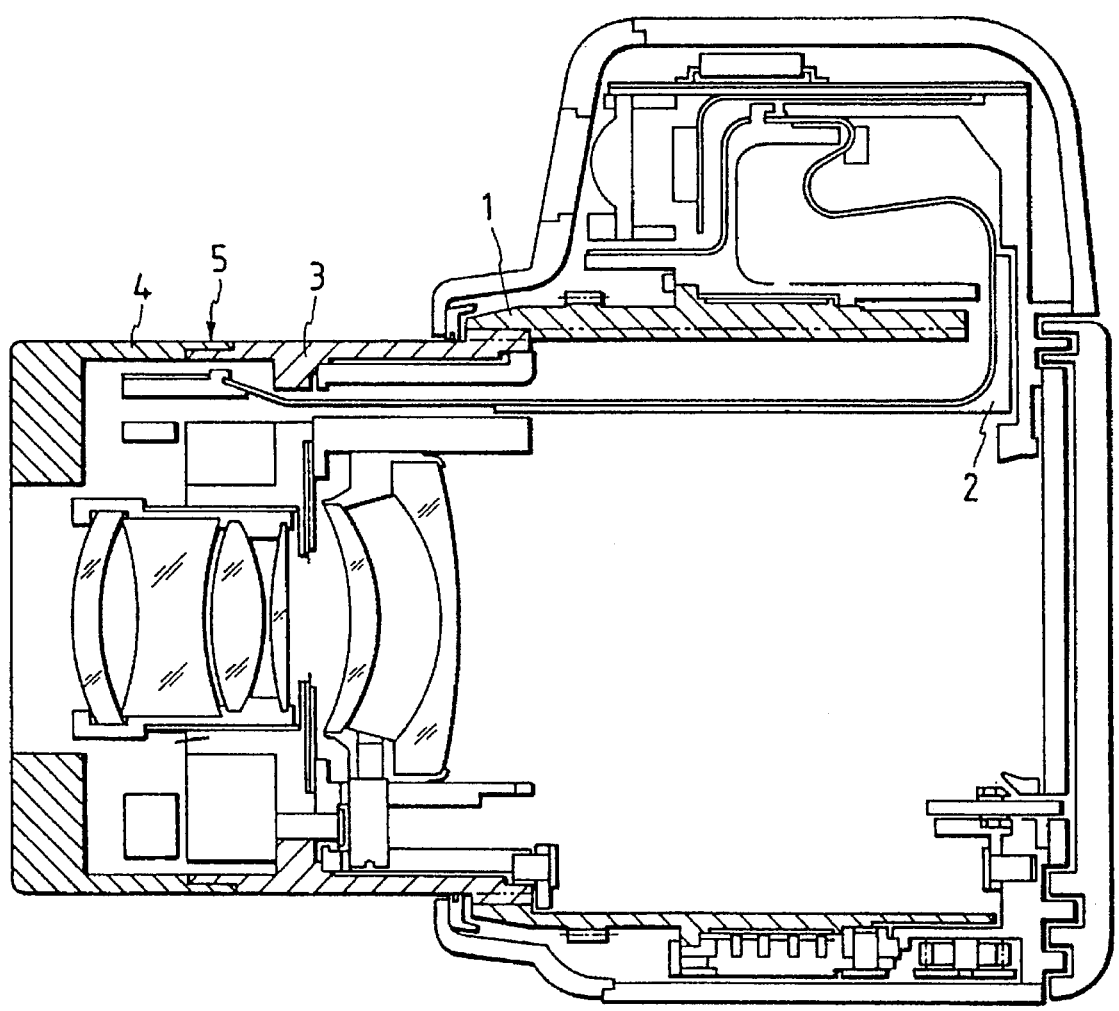
FIG. 1 shows a sectional view of a prior art compact camera having a lens barrel.
Figure 2:
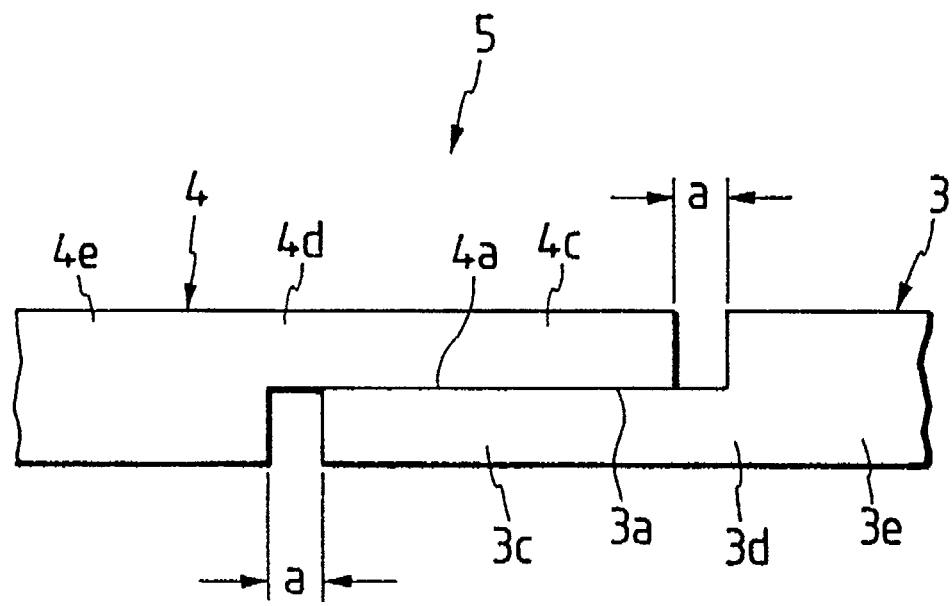
FIG. 2 shows an enlarged view of a prior art joint.
Figure 3:
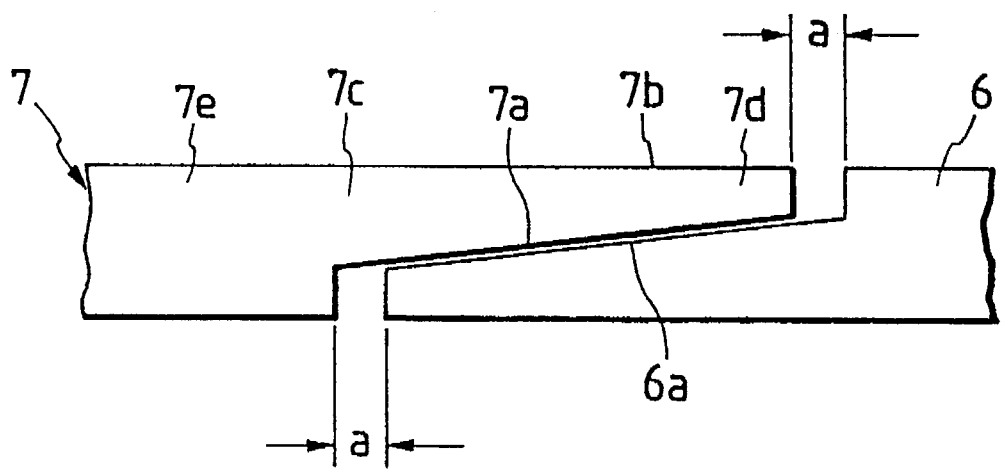
FIG. 3 shows an enlarged view of another prior art joint.
Figure 4:
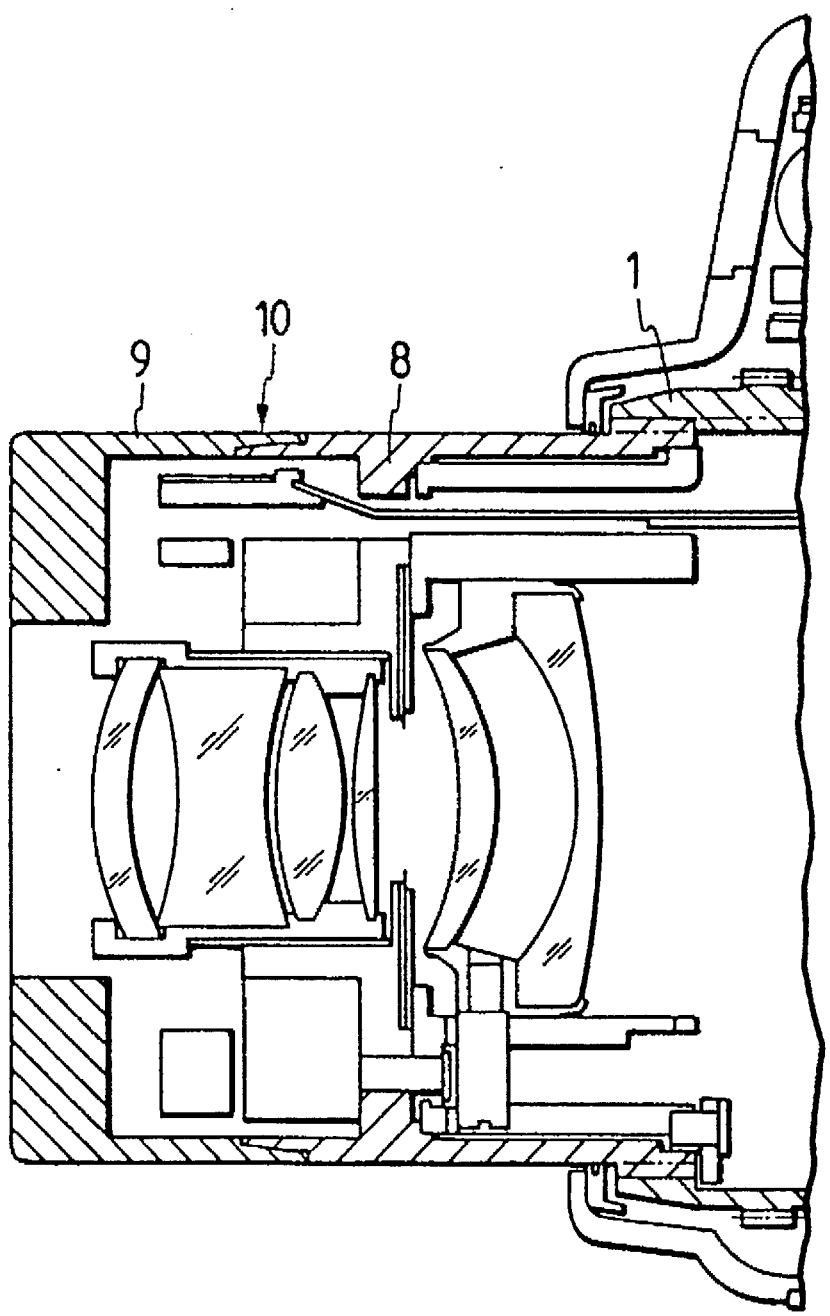
FIG. 4 shows a sectional view around a lens barrel of the present invention.
Figure 5:
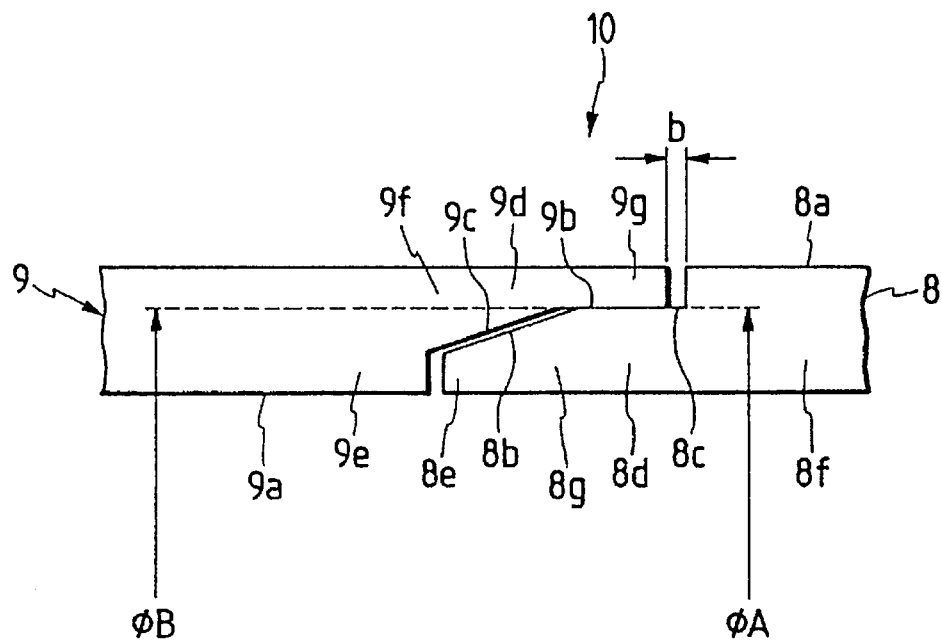
FIG. 5 shows an enlarged view of a joint 10 in FIG. 4.

FIGS. 4 and 5 show a first embodiment of the present invention. FIG. 4 shows a sectional view around a lens barrel, and FIG. 5 shows an enlarged view of a joint 10 of FIG. 4.

The lens barrel of the present embodiment has at least two joinable cylinders (8, 9) made of plastic. An outer periphery (8a) of one (8) of said two cylinders has a first periphery (8b) and a second periphery (8c) formed thereon circumferentially of said one cylinder sequentially from one end to the other end of said one cylinder. Said second periphery (8c) has a smaller outer diameter than that of the outer periphery (8a) of said one cylinder (8) and said first periphery (8b) is tapered such that an outer diameter thereof increases as it goes from said one end of said one cylinder to said second periphery (8c). An inner periphery (9a) of the other cylinder (9) having a third periphery (9b) and a fourth periphery (9c) formed thereon circumferentially of said other cylinder (9) sequentially from one end of said other cylinder (9) to the other end. Said third periphery (9b) has a larger inner diameter than that of said other cylinder (9) and said fourth periphery (9c) is tapered such that an inner diameter thereof decreases as it goes from said third periphery (9b) to the inner periphery of said other cylinder (9). Thus, said one cylinder (8) and said other cylinder (9) are joined such that said second periphery (8c) is fitted to said third periphery (9b) and said first periphery (8b) faces to said fourth periphery (9c).

In accordance with the first embodiment described above, even when the joint is shallow and a gap is created as shown by b in FIG. 5, the leakage of light into the lens barrel is prevented because the second periphery 8c is fitted to the third periphery 9b.

Further, since a portion 9f near a left thick portion 9e of a portion 9d including the fourth periphery 9c is slightly thinner than the left thick portion 9e, the sink mark is hard to form in the thick portion 9e and the portion 9d is prevented from being deformed. Further, since the portion 9d gradually reduces its thickness from the left to the right, the sink mark is hard to form in the portion 9d as well and hence a portion 9g including the third periphery 9b is prevented from being deformed.

In the cylinder 8, since the thickness of the portion 8d including the second periphery 8c is not much thinner than the right portion 8f as it is for the left end 8e, the sink mark is hard to form in the right thick portion 8f and hence the portion 8d including the second periphery 8c is prevented from being deformed. Further, since the thickness of the portion 8g including the taper 8b gradually decreases from the right to the left, the sink mark is hard to form in the portions 8d and 8e and the portions 8d and 8e are prevented from being deformed.

Since the portions 8d, 8e, 9d and 9g are prevented from being deformed, no gap is created between the second periphery 8c and the third periphery 9b and the leakage of light does not occur.

By simply changing the shape of the joint, it is not necessary for a worker to assemble with as much care and the assembling work is improved, and the construction is not complex, the number of parts is not increased and the cost is kept low.

Figure 6:
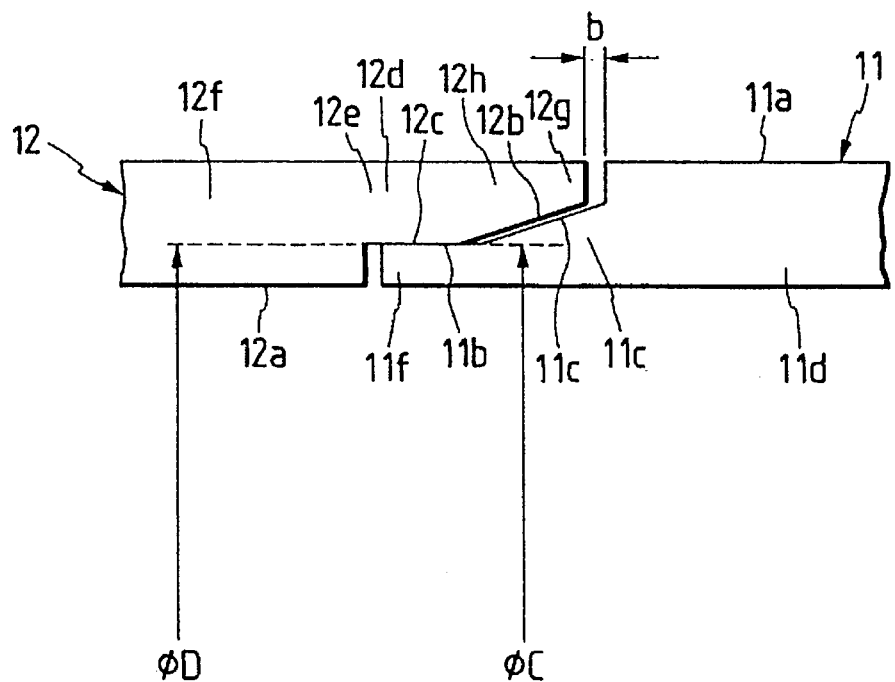
FIG. 6 shows an enlarged view of a joint in a second embodiment of the present invention.

FIG. 6 shows an enlarged view of a joint in a second embodiment. Numeral 11 denotes a male helicoid and numeral 12 denotes a cylinder. The cylinder 12 and the male helicoid 11 are made of plastic as they are in the previous embodiment.

In FIG. 6, an outer periphery 11a of the male helicoid 11 has a first periphery 11b and a second periphery 11c formed thereon circumferentially from the left to the right, and the first periphery 11b has a smaller outer diameter than that of the outer periphery 11a of the male helicoid 11. The second periphery 11c is tapered such that the diameter thereof increases as it goes from the first periphery 11b to the outer periphery 11a of the male helicoid 11.

An inner periphery 12a of the left cylinder 12 has a third periphery 12b and a fourth periphery 12c formed thereon circumferentially from the right end of the cylinder 12 to the left end, not shown. The fourth periphery 12c has a larger inner diameter than that of the inner periphery 12a of the cylinder 12. The third periphery 12b is tapered such that the inner diameter thereof decreases as it goes from the right end of the cylinder 12 to the fourth periphery 12c.

The first periphery 11b is fitted to the fourth periphery 12c and they are joined while the tapers 11c and 12b face to each other to form a lens barrel.

Even when the joint is shallow to leave a gap b as shown, the leakage of light into the lens barrel does not occur because the first periphery 11b is joined to the fourth periphery 12c, and it is not necessary to pay attention during the assembling work.

A portion 12e on the right of the root of a portion 12d including the fourth periphery 12c, of the cylinder 12 is thinner than a left thick portion 12f but it is not much thinner than the left thick portion 12f as it is for a right end portion 12g. As a result, the sink mark is hard to form in the thick portion 12f and the portion 12d is prevented from being deformed. Since the thickness of the portion 12h including the taper 12b gradually reduces from the left to the right, the sink mark is hard to form in the portion 12d including the fourth periphery 12c and the portion 12h is prevented from being deformed.

In the male helicoid 11, the sink mark is hard to be formed in the right thick portion 11d because of the taper 11c and the sink mark is hard to form in the portion 11e including the taper 11c as well. Accordingly, the portion 11f including the first periphery 11b and the portion 11e are prevented from being deformed.

Accordingly, no gap is created between the first periphery 11b and the fourth periphery 12c and the leakage of light is prevented.

Figure 7:
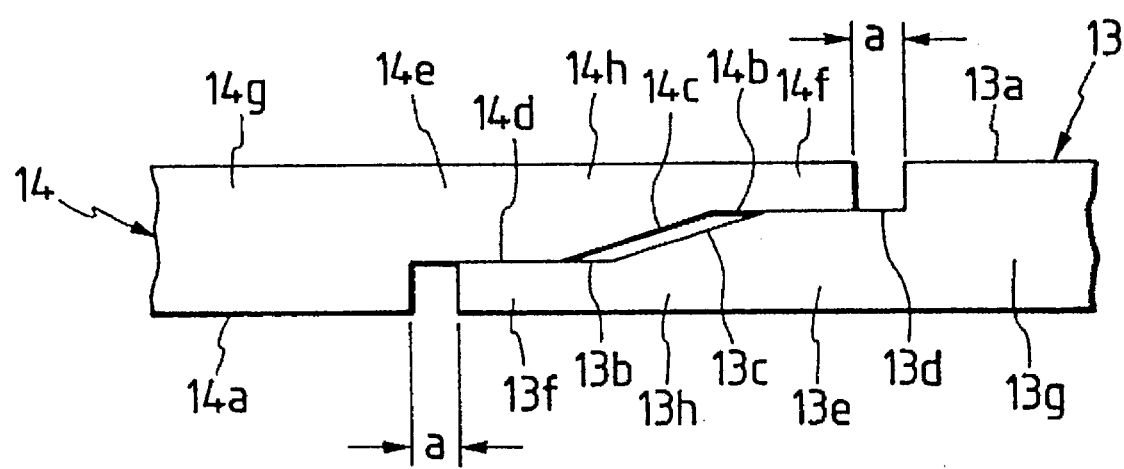
FIG. 7 shows an enlarged view of a joint in a third embodiment of the present invention.

FIG. 7 shows an enlarged view of a joint in a third embodiment. A male helicoid 13 and a cylinder 14 again are made of plastic.

In FIG. 7, an outer periphery 13a of the male helicoid 13 has a first periphery 13b, a second periphery 13c and a third periphery 13d formed thereon circumferentially from the left end to the right end, not shown. The third periphery 13d has a smaller outer diameter than that of the outer periphery 13a of the male helicoid 13. The first periphery 13b has a smaller outer diameter than that of the third periphery 13d, and the second periphery 13c is tapered such that the outer diameter thereof increases as it goes from the first periphery 13b to the third periphery 13d.

An inner periphery 14a of the left cylinder 14 has a fourth periphery 14b, a fifth periphery 14c and a sixth periphery 14d formed thereon circumferentially from the right end of the cylinder 14 to the left end, not shown. The sixth periphery 14d has a larger inner diameter than that of the inner periphery 14a of the cylinder 14. The fourth periphery 14b has a larger inner diameter than that of the sixth periphery 14d and the fifth periphery 14c is tapered such that the inner diameter thereof decreases as it goes from the fourth periphery 14b to the sixth periphery 14d.

The first periphery 13b is fitted to the sixth periphery 14d, and the third periphery 13d is fitted to the fourth periphery 14b and they are joined while the tapers 13c and 14c face each other to form a lens barrel.

Even if the joint is shallow to create a gap a as shown, the leakage of light into the lens barrel is prevented because of the joint of the first and sixth peripheries 13b and 14d and the third and fourth peripheries 13d and 14b.

Since the portion 14e including the sixth periphery 14d of the cylinder 14 is not much thinner than the left thick portion 14g while portion 14e is thicker than portion 14f including the fourth periphery 14b, the sink mark is hard to form in the thick portion 14g. Further, since the sink mark is hard to form in the portion 14h including the taper 14c as well, the portions 14e and 14f are prevented from being deformed.

Similarly, since the portion 13e including the third periphery of the male helicoid 13 is not much thinner than the right thick portion 13g while portion 13e is thicker than portion 13f including the first periphery 13b, the sink mark is hard to form in the thick portion 13g and the sink mark is hard to form in the portion 13h including the taper 13c as well, and the portions 13e and 13f are prevented from being deformed.

Accordingly, no gap is created between the first periphery 13b and the sixth periphery 14d and between the third periphery 13d and the fourth periphery 14b and the leakage of light is prevented.

In the present embodiment, the object is to prevent the leakage of light, although the light may be a liquid. For example, when it is a water droplet, the present invention is applicable to a water proof structure of a lens barrel. In a lens barrel of a single eye reflex camera other than the compact camera, FIGS. 5 to 7 are applicable when at least two cylinders are provided and joint is formed at an end of each cylinder.

In accordance with the present invention, only the design of the joint need be modified and the light shielding members such as a light shielding wall need not be changed. Accordingly the construction is not complex, the number of parts is not increased and the light shielding is attained without raising the cost.

Further, since it is not necessary to provide the light shielding member, the size of the lens barrel is not increased and the compactness of the camera is effectively attained. Further, since the leakage of light does not occur even if the joint is shallow so long as the pair of peripheries are joined, no attention need be paid during the assembly work and the workability is improved.

What is claimed is:

1. A lens barrel including at least two joinable cylinders, comprising:

a first cylinder having a first thickness including
        a first projecting portion with a second thickness, said first projecting portion protruding from an end of said first cylinder, and
        a tapered portion that tapers between the second thickness and a third thickness less than the first thickness; and a second cylinder engageable with said first cylinder and having a thickness equal to the first thickness and including
        a second projecting portion having a thickness that tapers between the third thickness and a fourth thickness less than the first thickness and greater than the second thickness.

2. A lens barrel including at least two joinable cylinders, comprising:

a first cylinder having a first thickness including
        a first tapered portion that tapers from an end of said first cylinder having a second thickness to a third thickness less than the first thickness and greater than the second thickness; and a second cylinder having a thickness equal to the first thickness including
        a projecting portion having a fourth thickness, and
        a second tapered portion that extends between said projecting portion and a portion having a fifth thickness less than said first thickness.

3. A lens barrel including at least two cylinders comprising:

a first cylinder having a first thickness including
        a first projecting portion having a second thickness being less than said first thickness, said first projecting portion projecting from an end of said first cylinder,
        a first tapered portion that tapers between said first projecting portion and a portion of said first cylinder having a third thickness less than the first thickness, and
        a first receiving portion having the third thickness; and a second cylinder having a thickness equal to the first thickness and including
        a second receiving portion having a fourth thickness less than said first thickness and adapted to engage with said first projecting portion,
        a second tapered portion that tapers between said second receiving portion and a portion having a fifth thickness, and
        a second projecting portion having the fifth thickness and adapted to engage with said first receiving portion.

* * * * *